United States Patent
Nakamura et al.

(10) Patent No.: US 6,245,433 B1
(45) Date of Patent: Jun. 12, 2001

(54) DIELECTRIC CERAMIC COMPOSITION AND LAMINATED CERAMIC CAPACITOR

(75) Inventors: Tomoyuki Nakamura, Shiga-ken; Shinobu Mizuno, Muko; Harunobu Sano, Kyoto, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/310,696

(22) Filed: May 12, 1999

(30) Foreign Application Priority Data

May 12, 1998 (JP) .................................. 10-128625

(51) Int. Cl.$^7$ ............................. C04B 35/468; H01G 4/12
(52) U.S. Cl. ..................... 428/469; 428/471; 428/697; 428/701; 428/702; 501/138; 501/139; 361/313; 361/320; 361/321.4; 361/321.5
(58) Field of Search ..................... 428/469, 697, 428/471, 702, 701; 501/134, 135, 136, 137, 138, 139; 361/321.4, 321.5, 306.3, 313, 309, 301.1, 311, 320, 321.2, 321.3

(56) References Cited

U.S. PATENT DOCUMENTS

| | | | |
|---|---|---|---|
| 5,181,157 | * | 1/1993 | Chazono et al. . |
| 5,248,640 | * | 9/1993 | Sano et al. . |
| 5,268,342 | * | 12/1993 | Nishiyama et al. . |
| 5,397,753 | * | 3/1995 | Nishiyama et al. . |
| 5,635,436 | * | 6/1997 | Fukuda et al. . |
| 5,646,081 | * | 7/1997 | Nishiyama et al. . |
| 5,801,111 | * | 9/1998 | Wada et al. . |
| 5,995,360 | * | 11/1999 | Hata et al. . |
| 6,051,516 | * | 4/2000 | Mizuno et al. . |

FOREIGN PATENT DOCUMENTS

| | | |
|---|---|---|
| 073755A1 | 10/1996 | (EP) . |
| 0785561A2 | 7/1997 | (EP) . |
| 0893419A1 | 1/1999 | (EP) . |

* cited by examiner

*Primary Examiner*—Deborah Jones
*Assistant Examiner*—Jennifer McNeil
(74) *Attorney, Agent, or Firm*—Ostrolenk, Faber, Gerb & Soffen, LLP

(57) ABSTRACT

A dielectric ceramic composition containing a primary component represented by the following formula: $\{BaO\}_m TiO_2 + \alpha M_2O_3 + \beta R_2O_3 + \gamma BaZrO_3 + gMgO + hMnO$ wherein $M_2O_3$ is at least one of $Sc_2O_3$ or $Y_2O_3$; $R_2O_3$ is at least one member selected from the group consisting of $Eu_2O_3$, $Gd_2O_3$, $Tb_2O_3$, $Dy_2O_3$, $Ho_2O_3$, $Er_2O_3$, $Tm_2O_3$ and $Yb_2O_3$; $\alpha$, $\beta$, $\gamma$, g or h represent a mole ratio and satisfy specified relations; and silicon oxide as an auxiliary component in an amount of 0.2–5.0 mol as $SiO_2$, with respect to 100 mol of the primary component.

20 Claims, 2 Drawing Sheets

DIELECTRIC CERAMIC COMPOSITION AND LAMINATED CERAMIC CAPACITOR

BACKGROUND OF THE INVENTION

1. Field of the Invention

The present invention relates to a dielectric ceramic composition and a laminated ceramic capacitor.

2. Background Art

A laminated ceramic capacitor is generally produced through the following procedure.

Briefly, a dielectric material sheet is prepared and a material for forming an internal electrode is applied thereto. A composition predominantly comprising $BaTiO_3$ may be used as the dielectric material. Subsequently, sheets of dielectric material to which the electrode material has been applied are laminated and compressed with heating, and the resultant substance is fired at 1250–1350° C. in air to thereby obtain a laminated ceramic having internal electrodes. Finally, external electrodes are baked onto both sides of the laminated ceramic so that the external electrodes can be connected to the internal electrodes to thereby obtain a laminated ceramic capacitor.

Noble metal such as platinum, gold, palladium or silver-palladium alloy has been used for the material of an internal electrode of a laminated ceramic capacitor. Although each of these metals has excellent properties required of a electrode material, these metals are expensive and increase manufacturing cost. Therefore, a laminated capacitor in which nickel, a base metal, is used for internal electrodes has been proposed so as to reduce manufacturing cost, and nickel has increasingly been used.

As electronic devices have become smaller in size, cheaper in price and of higher performance, the laminated ceramic capacitor is also required to be cheaper, more insulation-resistant from voltage breakdown, more insulated, more reliable and of higher capacitance. In order to reduce the price of electronic devices, a laminated ceramic capacitor in which nickel is used for internal electrodes is advantageously used because of its low price. However, conventional dielectric ceramic materials were designed to be used in a weak electric field only and they involve a problem in that insulation resistance, dielectric strength and reliability are drastically decreased when they are used in a strong electric field. No known laminated ceramic capacitor whose internal electrodes are formed of nickel can be used in a strong electric field.

More specifically, Japanese Patent Publication (kokoku) No. 42588/1982 and Japanese Patent Application Laid-Open (kokai) No. 101459/1986 disclose dielectric materials which have a high dielectric constant. However, the obtained dielectric ceramics have large crystal grains, resulting in disadvantages such as low dielectric strength of a laminated ceramic capacitor under a strong electric field and a short life in a high-temperature test.

Japanese Patent Publication (kokoku) No. 14611/1986 and Japanese Patent Application Laid-Open (kokai) No. 272971/1995 disclose dielectric materials which have high dielectric constants of 2000 or more and 3000 or more under a weak electric field, respectively. However, these materials have several disadvantages, such as a considerably low dielectric constant (electrostatic capacity) and low insulation resistance under a strong electric field. These materials comprise $Li_2O$—$SiO_2$ or $B_2O_3$—$SiO_2$ oxide serving as an additive component and these oxides diffuse while firing, causing lot-to-lot variation in electrical properties of fired products.

Accordingly, an object of the present invention is to provide a dielectric ceramic composition which can constitute a dielectric ceramic layer of a laminated ceramic capacitor, which has high weather resistance such as durability under high-temperature or good resistance in a humid environment, and which also has the following electric properties: the product of insulation resistance and electrostatic capacity represented by C×R is as high as 5000 Ω·F or more at room temperature and 200 Ω·F or more at 150° C. under a strong electric field of 10 kV/mm, insulation resistance exhibits low dependence on voltage, electrostatic capacity is highly stable with respect to a change of DC bias voltage, dielectric strength is high and the rate of change in electrostatic capacity with temperature satisfies the B characteristic specified by JIS specifications and X7R characteristic specified by EIA specifications. Another object of the present invention is to provide a laminated ceramic capacitor comprising an internal electrode constituted by Ni or Ni alloy and the aforementioned dielectric ceramic composition serving as a dielectric ceramic layer.

SUMMARY OF THE INVENTION

In order to attain the aforementioned objects, in one aspect of the present invention, there is provided a dielectric ceramic composition comprising a primary component formed of barium zirconate, magnesium oxide, manganese oxide, barium titanate having an alkali metal oxide content of 0.02 wt % or less and at least one member selected from the group consisting of europium oxide, gadolinium oxide, terbium oxide, dysprosium oxide, holmium oxide, erbium oxide, thulium oxide and ytterbium oxide; the primary component being represented by the following formula: $\{BOA\}_m TiO_2 + \beta R_2O_3 + \gamma BaZrO_3 + gMgO + hMnO$ wherein $R_2O_3$ is at least one member selected from the group consisting of $Eu_2O_3$, $Gd_2O_3$, $Tb_2O_3$, $Dy_2O_3$, $Ho_2O_3$, $Er_2O_3$, $Tm_2O_3$ and $Yb_2O_3$, and each of $\beta$, $\gamma$, g and h represents a mole ratio and satisfy the following relations;

$0.001 \leq \alpha \leq 0.06$;

$0.005 \leq \gamma \leq 0.06$;

$0.001 < g \leq 5\ 0.12$;

$0.001 < h \leq 0.12$;

$g + h \leq 0.13$; and $1.000 < m \leq 1.035$, and further comprises silicon oxide as an auxiliary component in an amount of 0.2–5.0 mol calculated as $SiO_2$, with respect to 100 mol of the primary component.

In another aspect of the present invention, there is provided a dielectric ceramic composition which comprises a primary component formed of barium titanate having an alkali metal oxide content of 0.02 wt % or less, at least one of scandium oxide or yttrium oxide, barium zirconate, magnesium oxide and manganese oxide, and represented by the following formula: $\{BOA\}_m TiO_2 + \alpha M_2O_3 + \gamma BaZrO_3 + gMgO + hMnO$ wherein $M_2O_3$ is at least one of $Sc_2O_3$ or $Y_2O_3$, and $\alpha$, $\gamma$, g and h each represents a mole ratio and satisfy the following relations:

$0.001 \leq \alpha \leq 0.06$;

$0.001 \leq \gamma \leq 0.06$;

$0.001 < g \leq 0.12$;

$0.001 < h \leq 0.12$;

$g + h \leq 0.13$; and $1.000 < m \leq 1.035$, and further comprises silicon oxide as an auxiliary component in an amount of 0.2–5.0 mol as $SiO_2$, with respect to 100 mol of the primary component.

Further, in still another aspect of the present invention, there is provided a dielectric ceramic composition which comprises a primary component formed of barium titanate having an alkali metal oxide content of 0.02 wt % or less, barium zirconate, magnesium oxide, manganese oxide, at least one of scandium oxide or yttrium oxide, and at least one member selected from the group consisting of europium oxide, gadolinium oxide, terbium oxide and dysprosium oxide; the primary component being represented by the following formula: $\{BaO\}_m TiO_2 + \alpha M_2O_3 + \beta R_2O_3 + \gamma BaZrO_3 + gMgO + hMnO$ wherein $M_2O_3$ is at least one of $Sc_2O_3$ or $Y_2O_3$, $R_2O_3$ is at least one member selected from the group consisting of $Eu_2O_3$, $Gd_2O_3$, $Tb_2O_3$, and $Dy_2O_3$, and $\alpha$, $\beta$, $\gamma$, g or h each represent a mole ratio and satisfy the following relations;

$0.001 \leq \alpha \leq 0.05$;

$0.001 \leq \beta \leq 0.05$;

$0.005 \leq \gamma \leq 0.06$;

$0.001 < g \leq 0.12$;

$0.001 < h \leq 0.12$;

$\alpha + \beta \leq 0.06$ $g + h \leq 0.13$; and $1.000 < m \leq 1.035$, and further comprises silicon oxide as an auxiliary component in an amount of 0.2–5.0 mol as $SiO_2$, with respect to 100 mol of the primary component.

The present invention is also directed to a laminated ceramic capacitor comprising a plurality of dielectric ceramic layers, internal electrodes formed between the dielectric ceramic layers and external electrodes electrically connected to the internal electrodes. In such a laminated ceramic capacitor, the dielectric ceramic layers are formed of the aforementioned dielectric ceramic composition of the present invention and the internal electrodes are formed of nickel or a nickel alloy.

In the laminated ceramic capacitor of the present invention, the external electrodes may comprise a first layer of conductive metal powder or glass frit-added conductive metal powder which has been sintered; and a second layer which is a plating layer provided on the first layer.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

BEST MODES FOR CARRYING OUT THE INVENTION

A basic structure of the laminated ceramic capacitor in one embodiment of the present invention will be described by reference of the figures.

Figure 1:
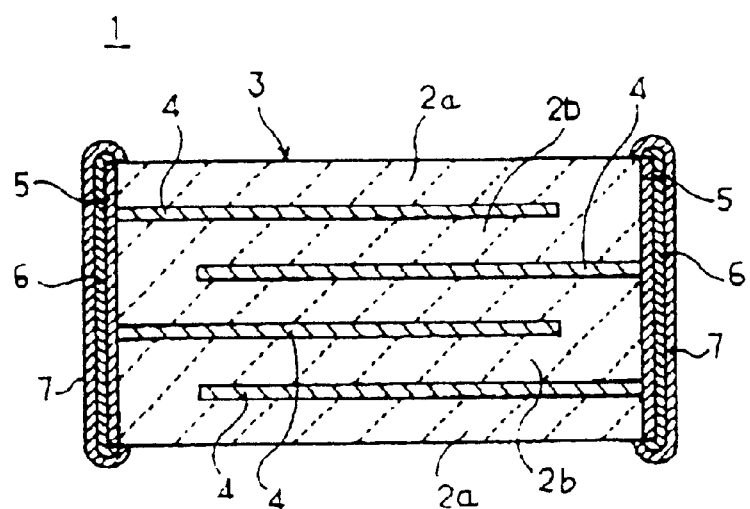
FIG. 1 a sectional view of an example of a laminated ceramic capacitor.
Figure 2:
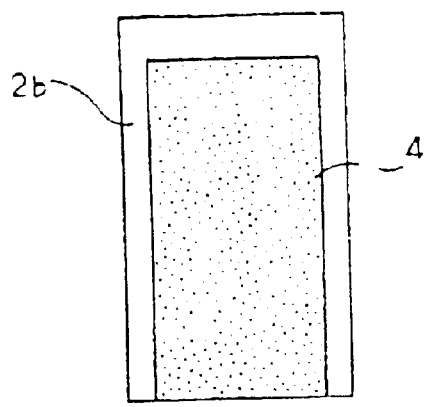
FIG. 2 is a plan view of a dielectric ceramic layer having an internal electrode in the laminated ceramic capacitor of FIG. 1.

As shown in FIG. 1, a laminated ceramic capacitor 1 of the embodiment comprises a rectangular laminated ceramic 3 which is obtained by laminating a plurality of dielectric ceramic layers 2a and 2b in which the layers have internal electrodes 4 between them. Additionally, external electrodes 5 are formed onto the both side faces of the laminated ceramic 3 such that they are connected to the specific internal electrodes 4. First layers 6, which comprise plating such as Ni or copper, are formed onto the external electrodes 5, and second layers 7, which comprises plating such as solder or tin, are formed onto the first layers 6.

The manufacturing process of the laminated ceramic capacitor 1 will next be described in the order of manufacturing steps.

First, raw powder material of barium titanate is provided. The raw material is to provide a mixture of any one of the following three types of primary components and silicon oxide serving as an auxiliary component and is to form dielectric ceramic layers 2a and 2b. The ingredients are weighed in predetermined proportions and mixed. The following three powder materials for producing dielectric ceramic compositions are prepared:

a material which comprises barium titanate containing alkali metal oxide in an amount of 0.02 wt % or less; at least one oxide selected from the group consisting of europium oxide, gadolinium oxide, terbium oxide, dysprosium oxide, holmium oxide, erbium oxide, thulium oxide and ytterbium oxide; barium zirconate; magnesium oxide; and manganese oxide;

a material which comprises barium titanate containing alkali metal oxide in an amount of 0.02 wt % or less; at least one oxide selected from scandium oxide and yttrium oxide; barium zirconate; magnesium oxide; and manganese oxide; and a material which comprises barium titanate containing alkali metal oxide in an amount of 0.02 wt % or less; at least one of scandium oxide or yttrium oxide, at least one element selected from the group consisting of europium oxide, gadolinium oxide, terbium oxide and dysprosium oxide; barium zirconate; magnesium oxide; and manganese oxide.

Subsequently, an organic binder is added into the weighed powder materials so as to prepare slurries. Each slurries is formed into a sheet to obtain green sheets for dielectric ceramic layers 2a and 2b.

Subsequently, an internal electrode 4 formed of nickel or an nickel alloy is formed on the main surface of the green sheet serving as a dielectric ceramic layer 2b. When the dielectric ceramic layers 2a and 2b are formed by use of the aforementioned dielectric ceramic composition, nickel or a nickel alloy can be used for forming the internal electrode 4. The internal electrode 4 may be formed through a method such as screen printing, vapor deposition, or plating.

Figure 3:
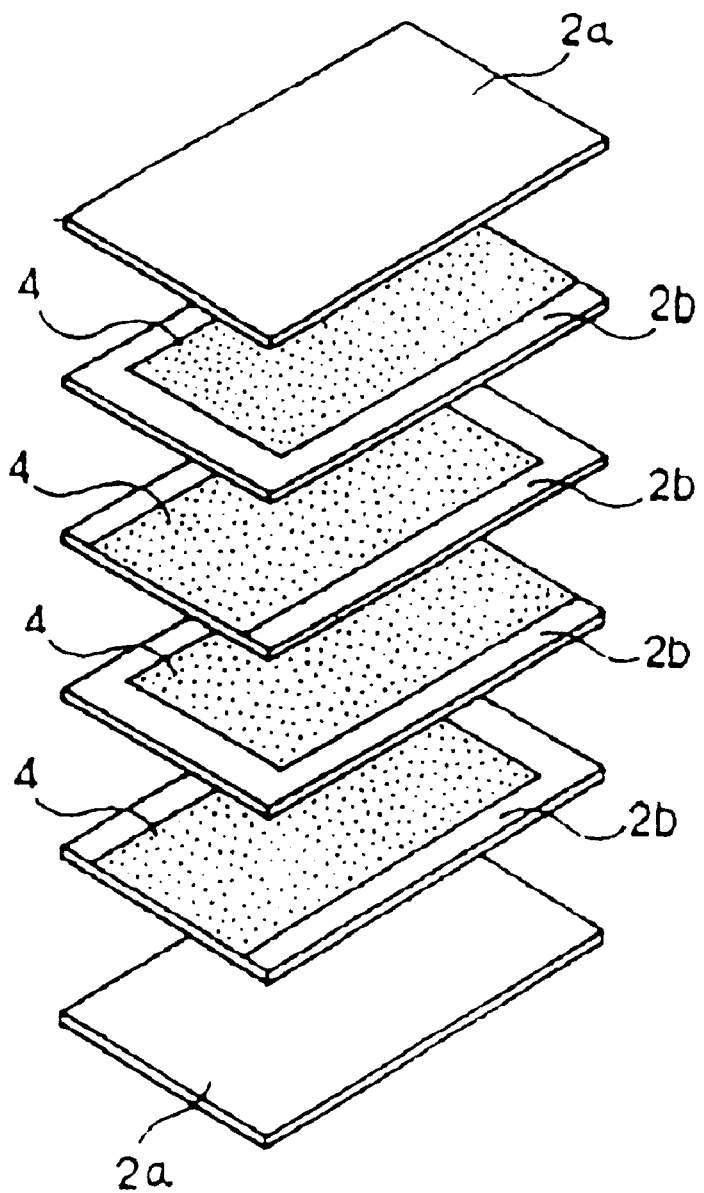
FIG. 3 is an exploded perspective view of a laminated ceramic in the laminated ceramic capacitor of FIG. 1.

Subsequently, green sheets serving as the dielectric ceramic layers 2b having internal electrodes 4 are laminated as desired, and the resultant laminated product is sandwiched by two green sheets having no internal electrode serving as dielectric ceramic layers 2a shown in FIG. 3, and the product is compressed to thereby obtain a green laminated ceramic.

The green laminated ceramic is fired at a predetermined temperature in a reducing atmosphere to thereby obtain a laminated ceramic 3.

Subsequently, external electrodes 5 are formed on both side faces of the laminated ceramic 3 such that they are electrically connected to the internal electrodes 4. The external electrodes 5 may be formed of a material identical to that of the internal electrodes 4. Examples of the material which may be used include silver, palladium, silver-palladium alloys, copper, copper-alloys and powders of these metals or alloys to which a glass frit formed of $B_2O_3$—$SiO_2$—BaO glass, $Li_2O$—$SiO_2$—BaO glass, etc. is added. The material is appropriately selected in consideration of the application and site for employing the laminated ceramic capacitors. The external electrodes 5 are formed by applying a metal powder paste as an electrode material to the laminated ceramic 3 which is obtained by firing and further baking. Alternatively, the paste may be applied to the laminated ceramic 3 before firing and then the entirety may be baked.

Subsequently, the external electrodes 5 are plated with nickel, copper, etc., to thereby form first plating layers 6. Finally, second plating layers 7 formed of solder, tin, etc. are formed on the first plating layers 6, to produce a laminated ceramic capacitor 1. Such formation of metal layers on the external electrodes 5 may be omitted depending on the application of laminated ceramic capacitors.

As described hereinabove, the above-described dielectric ceramic composition does not deteriorate the properties of the laminated ceramic capacitor when the composition is fired in a reducing atmosphere in order to form dielectric ceramic layers 2a and 2b. Thus, the ceramic capacitor had excellent properties described below. That is, when the capacitor is used under high electric field of 10 kV/mm, the product of insulation resistance and electrostatic capacity represented by C×R is as high as 5000 Ω·F or more at room temperature and 200 Ω·F or more at 150° C. The dependence of insulation resistance on voltage is low. The absolute value of rate of reduction in capacitance is as low as 45% or less when DC voltage of 5 kV/mm is applied. The breakdown voltage is high. The temperature characteristics of electrostatic capacity satisfy the B characteristic specified by JIS specifications within a range of −25° C. to +85° C. and satisfy the X7R characteristic specified by EIA specifications within a range of −55° C. to +125° C. The resistance properties as determined under load of high temperature at 25 kV/mm (DC) and 150° C. and in high humidity are excellent.

Impurities contained in barium titanate, which is one of the primary components of the dielectric ceramic composition, include alkaline earth metal oxides such as SrO or CaO, alkali metal oxides such as $Na_2O$ or $K_2O$, and other oxides such as $Al_2O_3$ or $SiO_2$. Among them, in particular, the alkali metal oxide has been confirmed to affect electric characteristics thereof. However, the relative dielectric constant can be maintained at 1000 or more by adjusting the content of alkali metal oxide to 0.02 wt. % or less, to thereby use the dielectric ceramic composition in practice without any problem.

Silicon oxide serving as an auxiliary component is added to the dielectric ceramic composition, since the oxygen partial pressure in a firing atmosphere is adjusted to an oxygen partial pressure at equilibrium of Ni/NiO at a relatively high temperature state during the firing step, to thereby enhance sinterability and resistance characteristics in humid conditions. In addition, silicon oxide, which is different from an oxide such as $Li_2O$—$Si_2O$ or $B_2O_3$—$SiO_2$, has excellent dispersibility in a green sheet and does not evaporate during firing, to thereby attain uniform lot-to-lot electric characteristics of fired ceramics.

EXAMPLES

The present invention will next be described in more detail by way of examples, which should not be construed as limiting the invention thereto.

Example 1

Titanium tetrachloride ($TiCl_4$) and barium nitrate (Ba$(NO_3)_2$) samples having a variety of purities were prepared as starting materials and weighed. Oxalic acid was added to precipitate titanyl barium oxalate (chemical formula: {BaTiO$(C_2O_4)$·4H$_2$O}). The precipitate was decomposed with heat at 1000° C. or more to thereby prepare the four types of barium titanate ($BaTiO_3$) shown in Table 1.

TABLE 1

| Type of barium titanate ($BaTiO_3$) | Impurity content (wt. %) | | | | | Average particle size ($\mu$m) |
|---|---|---|---|---|---|---|
| | Alkali metal oxide | SrO | CaO | $SiO_2$ | $Al_2O_3$ | |
| A | 0.003 | 0.012 | 0.001 | 0.01 | 0.005 | 0.6 |
| B | 0.02 | 0.01 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

$BaCO_3$ and several types of oxides having purity of 99% or more were prepared. The oxides included $Eu_2O_3$, $Gd_2O_3$, $Tb_2O_3$, $Dy_2O_3$, $Ho_2O_3$, $Er_2O_3$, $Tm_2O_3$, $Yb_2O_3$, $BaZrO_3$, MgO, and MnO. $BaCO_3$ was used for adjusting the mole ratio of Ba/Ti in the barium titanate.

Colloidal silica comprising 20 wt. % silicon oxide calculated as $SiO_2$ was also prepared as an auxiliary component.

These powder materials and the silicon oxide serving as an auxiliary component were weighed to prepare the compositions shown in Table 2. The amount of added silicon oxide is represented as an amount by mol with respect to 100 mol of the primary component, [{BaO}$_m$TiO$_2$+$\beta R_2O_3$+$\gamma BaZrO_3$+gMgO+hMnO].

TABLE 2

| | | {BaO}$_m$·TiO$_2$ + $\beta R_2O_3$ + $\gamma BaZrO_3$ + gMgO + hMnO | | | | | | | | | | | | | | $SiO_2$ |
|---|---|---|---|---|---|---|---|---|---|---|---|---|---|---|---|---|
| Sample | Type of | $\beta$ | | | | | | | | | | | | | | |
| No. | $BaTiO_3$ | $Eu_2O_3$ | $Gd_2O_3$ | $Tb_2O_3$ | $Dy_2O_3$ | $Ho_2O_3$ | $Er_2O_3$ | $Tm_2O_3$ | $Yb_2O_3$ | Total $\beta$ | $\gamma$ | g | h | g + h | m | (mol) |
| *1 | A | 0 | 0 | 0 | 0.0008 | 0 | 0 | 0 | 0 | 0.0008 | 0.03 | 0.07 | 0.01 | 0.08 | 1.005 | 3 |
| *2 | A | 0 | 0.04 | 0 | 0 | 0.03 | 0 | 0 | 0 | 0.07 | 0.02 | 0.03 | 0.09 | 0.12 | 1.01 | 2 |
| *3 | A | 0 | 0.02 | 0 | 0 | 0 | 0.02 | 0 | 0 | 0.04 | 0 | 0.05 | 0.04 | 0.09 | 1.01 | 2 |
| *4 | A | 0 | 0 | 0.01 | 0.02 | 0 | 0 | 0 | 0 | 0.03 | 0.08 | 0.02 | 0.02 | 0.04 | 1.005 | 1.5 |
| *5 | A | 0 | 0.02 | 0 | 0 | 0 | 0 | 0 | 0 | 0.02 | 0.03 | 0.001 | 0.049 | 0.05 | 1.005 | 1 |
| *6 | A | 0.02 | 0 | 0 | 0.03 | 0 | 0 | 0 | 0.01 | 0.06 | 0.01 | 0.125 | 0.002 | 0.127 | 1.01 | 4 |
| *7 | A | 0 | 0 | 0.01 | 0 | 0 | 0 | 0.01 | 0 | 0.02 | 0.04 | 0.039 | 0.001 | 0.04 | 1.01 | 2 |
| *8 | A | 0 | 0 | 0.04 | 0 | 0 | 0.02 | 0 | 0 | 0.06 | 0.01 | 0.002 | 0.125 | 0.127 | 1.01 | 1 |
| *9 | A | 0 | 0.02 | 0.03 | 0 | 0.01 | 0 | 0 | 0 | 0.06 | 0.04 | 0.05 | 0.11 | 0.16 | 1.01 | 2 |

TABLE 2-continued

{BaO}$_m$·TiO$_2$ + βR$_2$O$_3$ + γBaZrO$_3$ + gMgO + hMnO

| Sample No. | Type of BaTiO$_3$ | β Eu$_2$O$_3$ | Gd$_2$O$_3$ | Tb$_2$O$_3$ | Dy$_2$O$_3$ | Ho$_2$O$_3$ | Er$_2$O$_3$ | Tm$_2$O$_3$ | Yb$_2$O$_3$ | Total β | γ | g | h | g + h | m | SiO$_2$ (mol) |
|---|---|---|---|---|---|---|---|---|---|---|---|---|---|---|---|---|
| *10 | A | 0 | 0 | 0.02 | 0 | 0 | 0 | 0 | 0 | 0.02 | 0.02 | 0.01 | 0.03 | 0.04 | 0.99 | 1 |
| *11 | A | 0 | 0 | 0 | 0.03 | 0 | 0 | 0 | 0 | 0.03 | 0.05 | 0.04 | 0.02 | 0.06 | 1 | 2 |
| *12 | A | 0 | 0 | 0 | 0 | 0 | 0 | 0.01 | 0 | 0.01 | 0.01 | 0.01 | 0.01 | 0.02 | 1.04 | 4 |
| *13 | A | 0 | 0 | 0.01 | 0 | 0.01 | 0 | 0 | 0 | 0.02 | 0.01 | 0.01 | 0.01 | 0.02 | 1.01 | 0 |
| *14 | A | 0 | 0 | 0.01 | 0 | 0 | 0 | 0.02 | 0 | 0.03 | 0.04 | 0.03 | 0.03 | 0.06 | 1.01 | 0.1 |
| *15 | A | 0 | 0 | 0 | 0 | 0.04 | 0 | 0 | 0 | 0.04 | 0.03 | 0.1 | 0.01 | 0.11 | 1.01 | 8 |
| *16 | D | 0 | 0 | 0 | 0.02 | 0 | 0.01 | 0 | 0 | 0.03 | 0.02 | 0.03 | 0.01 | 0.04 | 1.01 | 2 |
| 17 | B | 0 | 0 | 0 | 0 | 0.02 | 0 | 0 | 0 | 0.02 | 0.02 | 0.02 | 0.01 | 0.03 | 1.005 | 1 |
| 18 | C | 0 | 0.02 | 0 | 0 | 0 | 0 | 0.01 | 0 | 0.03 | 0.02 | 0.03 | 0.02 | 0.05 | 1.015 | 1.5 |
| 19 | A | 0.02 | 0 | 0 | 0.03 | 0 | 0 | 0 | 0 | 0.05 | 0.03 | 0.002 | 0.12 | 0.122 | 1.01 | 1.5 |
| 20 | A | 0 | 0.001 | 0 | 0 | 0 | 0 | 0 | 0 | 0.001 | 0.03 | 0.11 | 0.02 | 0.13 | 1.01 | 4 |
| 21 | A | 0 | 0 | 0.02 | 0.04 | 0 | 0 | 0 | 0 | 0.06 | 0.02 | 0.005 | 0.01 | 0.015 | 1.01 | 3 |
| 22 | A | 0 | 0.01 | 0 | 0 | 0 | 0.01 | 0 | 0 | 0.02 | 0.005 | 0.03 | 0.02 | 0.05 | 1.01 | 1.5 |
| 23 | A | 0 | 0 | 0 | 0.01 | 0 | 0 | 0.01 | 0 | 0.02 | 0.06 | 0.01 | 0.03 | 0.04 | 1.005 | 1 |
| 24 | A | 0 | 0 | 0 | 0.02 | 0 | 0.01 | 0 | 0 | 0.03 | 0.03 | 0.02 | 0.04 | 0.06 | 1.035 | 3 |
| 25 | A | 0 | 0.01 | 0 | 0 | 0.01 | 0 | 0 | 0 | 0.02 | 0.03 | 0.005 | 0.045 | 0.05 | 1.015 | 0.2 |
| 26 | A | 0 | 0 | 0 | 0 | 0.01 | 0 | 0 | 0 | 0.01 | 0.03 | 0.12 | 0.002 | 0.122 | 1.01 | 5 |
| 27 | A | 0.01 | 0 | 0 | 0 | 0 | 0.01 | 0 | 0 | 0.02 | 0.02 | 0.02 | 0.02 | 0.04 | 1.01 | 1.5 |
| 28 | A | 0 | 0 | 0.01 | 0 | 0 | 0 | 0 | 0 | 0.01 | 0.02 | 0.015 | 0.005 | 0.02 | 1.01 | 1.5 |
| 29 | A | 0.01 | 0 | 0 | 0 | 0 | 0.01 | 0 | 0 | 0.02 | 0.03 | 0.01 | 0.04 | 0.05 | 1.01 | 1.5 |

Samples marked with * are beyond the scope of present invention.

Subsequently, organic solvents such as polyvinyl butyral binder and ethanol were added to the weighed materials and the resultant mixture was wet-mixed by use of a ball mill so as to prepare a ceramic slurry. The ceramic slurry was formed into a sheet by use of a doctor blade to obtain a green rectangular sheet having a thickness of 35 $\mu$m. After the above process, a conductive paste predominantly comprising nickel was applied to a surface of the ceramic green sheet so as to form a conductive paste layer for constituting an internal electrode.

The ceramic green sheets having conductive paste layers formed thereon were laminated so that leading ends of the conductive paste films on the ceramic green sheet were arranged alternately in order to obtain a laminated substrate. The laminated substrate was heated at 350° C. in a nitrogen atmosphere to decompose the binder, and fired at a temperature shown in Table 3 for two hours in a reducing atmosphere of H$_2$—N$_2$—H$_2$O gas containing oxygen at a partial pressure of $10^{-9}$–$10^{-12}$ MPa so as to obtain a ceramic sintered body.

After firing, a silver paste comprising B$_2$O$_3$—Li$_2$O—SiO$_2$—BaO glass frit was applied to the surface of each side of the obtained ceramic sintered body, followed by firing in a nitrogen atmosphere at 600° C. to form external electrodes electrically connected to the internal electrodes.

The laminated ceramic capacitor obtained by the above processes had a width of 5.0 mm, a length of 5.7 mm and a thickness of 2.4 mm, and dielectric ceramic layers each had a thickness of 30 $\mu$m. The total number of effective dielectric ceramic layers was 57 and the area of opposing electrodes per layer was $8.2 \times 10^{-5}$ m$^2$.

Subsequently, a nickel plating solution comprising nickel sulfate, nickel chloride and boric acid was prepared to form nickel plating layers on the surface of the external electrodes by use of a barrel plating method. Finally, a solder plating solution prepared from an AS (alkanol sulfonic acid) bath was prepared to form solder plating layers on the nickel plating layers by use of a barrel plating method.

After formation of these laminated ceramic capacitors, their electric characteristics were measured. Electrostatic capacity (C) and dielectric loss (tan δ) were measured at 1 kHz, 1 Vrms and 25° C. by use of an automatic bridge instrument so as to calculate dielectric constant (∈) from electrostatic capacity. Subsequently, insulation resistance (R) was measured at 25° C. and 150° C. by application of direct-current voltages of 315 V (i.e. 10 kV/mm) and 945 V (i.e. 30 kV/mm) by use of an insulation resistance tester so as to obtain C×R, which represents the product of electrostatic capacity and insulation resistance.

The laminated ceramic capacitor was also evaluated for the rate of change in electrostatic capacity with temperature. The rate of change in electrostatic capacity was measured at −25° C. and 85° C., with the electrostatic capacity at 20° C. being used as a standard (ΔC/C$_{20}$), and at −55° C. and 125° C. with the electrostatic capacity at 25° C. being used as a standard (ΔC/C$_{25}$). The maximum absolute value of rate of change in electrostatic capacity was also measured in a range between −55° C. and 125° C. (|ΔC|max).

The laminated ceramic capacitor was also evaluated for DC bias characteristic. Electrostatic capacity was measured under application of an AC voltage of 1 kHz and 1 Vrms. Electrostatic capacity was also measured under simultaneous application of DC 150 V and an AC voltage of 1 kHz and 1 Vrms. The rate of reduction in electrostatic capacity (ΔC/C) induced by DC voltage was calculated.

In a high temperature test, the time-course change of insulation resistance was measured under application of 750 V DC (i.e. 25 kV/mm) at 150° C. for 36 capacitors for each sample. In a durability test under high temperature, the time until the insulation resistance of the capacitors fell to 10$^5$ Ω or less was regarded the life, and the average life of the capacitors was calculated.

In a humidity resistance test, a DC voltage of 315 V was applied to 72 capacitors of each sample for 250 hours at 120° C. and a pressure of 2 atmospheres (relative humidity: 100%) so as to count the number of capacitors for each sample No. having insulation resistance of 10$^6$ Ω or less.

Breakdown voltage was also measured by application of AC or DC voltage at a voltage elevation rate of 100 V/sec, and breakdown voltage for both AC voltage and DC voltage was measured.

The results are shown in Table 3.

TABLE 3

| Sample No. | Firing temperature (° C.) | Dielectric constant | Dielectric loss: tan δ (%) | Rate of change in capacitance with temperature (%) | | | | Maximum value | DC bias characteristic (%) $\Delta C/C_{25}$ 5 kV/mm |
|---|---|---|---|---|---|---|---|---|---|
| | | | | $\Delta C/C_{20}$ | | $\Delta C/C_{25}$ | | | |
| | | | | −25° C. | 85° C. | −55° C. | 125° C. | | |
| *1 | 1300 | 1900 | 0.8 | 2.0 | −8.7 | 4.2 | −12.6 | 13.3 | −50 |
| *2 | 1300 | 840 | 0.9 | 3.6 | −14.8 | 6.6 | −23.3 | 23.5 | −13 |
| *3 | 1280 | 1340 | 0.9 | 3.5 | −8.6 | 3.2 | −13.5 | 13.5 | −31 |
| *4 | 1300 | 1400 | 1 | 3.6 | −13.1 | 4.1 | −28.5 | 28.7 | −35 |
| *5 | 1280 | 1530 | 0.9 | 3.5 | −13.3 | 3.9 | −17.3 | 17.3 | −42 |
| *6 | 1360 | 970 | 2.6 | 3 | −9 | 4.6 | −12.7 | 12.9 | −15 |
| *7 | Not measurable because of semiconductivity | | | | | | | | |
| *8 | 1280 | 1080 | 0.8 | 4.3 | −9.1 | 4.6 | −18.2 | 18.4 | −15 |
| *9 | 1280 | 1020 | 2.5 | 3 | −9.1 | 4 | −13.6 | 13.6 | −16 |
| *10 | Not measurable because of semiconductivity | | | | | | | | |
| *11 | 1300 | 1450 | 1 | 3.3 | −9.5 | 3.7 | −13.5 | 13.5 | −39 |
| *12 | Not measurable because of poor sintering | | | | | | | | |
| *13 | Not measurable because of poor sintering | | | | | | | | |
| *14 | 1360 | 1470 | 0.8 | 3.4 | −9.4 | 3.9 | −13 | 13 | −39 |
| *15 | 1280 | 1020 | 0.9 | 3.3 | −13.1 | 3.9 | −28.4 | 28.4 | −14 |
| *16 | 1300 | 1050 | 0.8 | 2.9 | −8.8 | 4.1 | −13.6 | 13.6 | −16 |
| 17 | 1280 | 1570 | 0.8 | 2.6 | −9.1 | 3.7 | −13.7 | 13.7 | −41 |
| 18 | 1280 | 1480 | 0.8 | 2.9 | −8.9 | 3.8 | −13.1 | 13.1 | −37 |
| 19 | 1300 | 1150 | 0.7 | 3.3 | −8.9 | 4.1 | −13.7 | 13.7 | −17 |
| 20 | 1300 | 1660 | 0.9 | 3.3 | −9 | 3.9 | −13.7 | 13.7 | −44 |
| 21 | 1300 | 1030 | 0.7 | 3.4 | −9.2 | 3.9 | −13.7 | 13.7 | −14 |
| 22 | 1300 | 1560 | 0.7 | 3.1 | −9.2 | 3.7 | −13.6 | 13.6 | −40 |
| 23 | 1280 | 1550 | 0.7 | 3.1 | −8.9 | 4.1 | −12.7 | 12.7 | −40 |
| 24 | 1280 | 1440 | 0.7 | 3.4 | −9 | 4 | −13.1 | 13.1 | −36 |
| 25 | 1300 | 1560 | 0.7 | 4.1 | −8.7 | 4 | −13.6 | 13.6 | −40 |
| 26 | 1300 | 1500 | 0.7 | 4 | −8.8 | 3.8 | −13.6 | 13.6 | −42 |
| 27 | 1300 | 1510 | 0.8 | 3.5 | −8.6 | 4.2 | −12.8 | 12.8 | −41 |
| 28 | 1300 | 1580 | 0.7 | 3.3 | −8.9 | 3.6 | −13.5 | 13.5 | −42 |
| 29 | 1280 | 1550 | 0.7 | 3.4 | −8.8 | 3.5 | −13 | 13 | −42 |

| Sample No. | C × R (Ω · F) | | | | Breakdown voltage (kV/mm) | | Number of defective capacitors in humidity resistance test | Average life (h) |
|---|---|---|---|---|---|---|---|---|
| | Application of 315 V | Application of 945 V | Application of 315 V | Application of 945 V | | | | |
| | 25° C. | | 150° C. | | AC | DC | | |
| *1 | 3020 | 2870 | 120 | 120 | 13 | 14 | 0/72 | 840 |
| *2 | 5090 | 4840 | 220 | 210 | 12 | 14 | 0/72 | 180 |
| *3 | 3000 | 2090 | 130 | 90 | 12 | 14 | 0/72 | 800 |
| *4 | 5140 | 4880 | 220 | 210 | 12 | 14 | 0/72 | 130 |
| *5 | 3020 | 2870 | 130 | 120 | 13 | 14 | 0/72 | 870 |
| *6 | 5100 | 4850 | 220 | 210 | 13 | 14 | 51/72 | 190 |
| *7 | Not measurable because of semiconductivity | | | | | | | |
| *8 | 3080 | 2930 | 120 | 110 | 12 | 14 | 0/72 | 120 |
| *9 | 5060 | 4810 | 240 | 230 | 12 | 14 | 19/72 | 90 |
| *10 | Not measurable because of semiconductivity | | | | | | | |
| *11 | 3160 | 3000 | 180 | 170 | 10 | 11 | 0/72 | 180 |
| *12 | Not measurable because of poor sintering | | | | | | | |
| *13 | Not measurable because of poor sintering | | | | | | | |
| *14 | 3140 | 2980 | 170 | 160 | 12 | 14 | 34/72 | 810 |
| *15 | 3270 | 3110 | 150 | 140 | 13 | 14 | 0/72 | 830 |
| *16 | 5120 | 4860 | 260 | 250 | 13 | 15 | 0/72 | 840 |
| 17 | 5080 | 4830 | 250 | 240 | 12 | 14 | 0/72 | 930 |
| 18 | 5120 | 4870 | 220 | 210 | 13 | 15 | 0/72 | 900 |
| 19 | 5200 | 4940 | 260 | 250 | 13 | 15 | 0/72 | 890 |
| 20 | 5280 | 5020 | 220 | 210 | 12 | 14 | 0/72 | 840 |
| 21 | 5080 | 4830 | 230 | 220 | 13 | 14 | 0/72 | 890 |
| 22 | 5100 | 4840 | 270 | 260 | 13 | 15 | 0/72 | 840 |
| 23 | 5200 | 4940 | 230 | 220 | 12 | 15 | 0/72 | 800 |
| 24 | 5260 | 5000 | 260 | 250 | 12 | 14 | 0/72 | 870 |
| 25 | 5180 | 4920 | 220 | 210 | 12 | 14 | 0/72 | 800 |
| 26 | 5110 | 4860 | 240 | 230 | 12 | 14 | 0/72 | 880 |
| 27 | 5260 | 5000 | 290 | 280 | 12 | 14 | 0/72 | 830 |
| 28 | 5270 | 4990 | 260 | 250 | 13 | 14 | 0/72 | 870 |
| 29 | 5140 | 4880 | 290 | 280 | 13 | 14 | 0/72 | 890 |

Samples marked with * are beyond the scope of the present invention

As is clearly shown in Tables 1 through 3, the laminated ceramic capacitors of the present invention provide the following results: the rate of reduction in capacitance was −45% or less under application of a DC voltage of 5 kV/mm, dielectric loss was 1.0% or less, and the rate of change in electrostatic capacity with temperature satisfied the B characteristics specified by JIS specifications within a range of −25° C. to +85° C., and satisfied the X7R characteristics specified by EIA specifications within a range of −55° C. to +125° C.

When the laminated ceramic capacitor was used under a strong electric field of 10 kV/mm, insulation resistance represented by C×R was as high as 5000 Ω·F or more at 25° C., and 200 Ω·F or more at 150° C. Breakdown voltage was as high as 12 kV/mm or more under application of AC voltage, and 14 kV/mm or more under application of DC voltage. In an accelerated test under 25 kV/mm at 150° C., the capacitor had a long life of 800 hours or longer and could be fired at a relatively low temperature of 1300° C. or lower. There was little difference in electric properties between lots of capacitors, which are not shown in any tables.

Next will be described the reason why the composition of the present invention is limited as described.

The composition of the present invention has the formula $\{BaO\}_m TiO_2+\beta R_2O_3+\gamma BaZrO_3+gMgO+hMnO$ wherein $R_2O_3$ is at least one member selected from the group consisting of $Eu_2O_3$, $Gd_2O_3$, $Tb_2O_3$, $Dy_2O_3$, $Ho_2O_3$, $Er_2O_3$, $Tm_2O_3$, and $Yb_2O_3$, and $\beta$, $\gamma$, g and h each represent a mole ratio. When the $R_2O_3$ content represented by $\beta$ is less than 0.001 as in the case of Sample No. 1, insulation resistance and C×R are disadvantageously low. When $\beta$ is more than 0.06 as in the case of Sample No. 2, temperature-dependent characteristics fail to satisfy the B and X7R characteristics to yield poor reliability. Therefore, $\beta$ preferably falls within a range of $0.001 \leq \beta \leq 0.06$.

When the $BaZrO_3$ content represented by $\gamma$ is 0 as in the case of Sample No. 3, insulation resistance is low and voltage dependence of insulation resistance is unfavorably high, as compared with samples including $BaZrO_3$. When $\gamma$ is more than 0.06 as in the case of Sample No. 4, temperature-dependent characteristics fail to satisfy the B and X7R characteristics and the average life is disadvantageously short. Therefore, $\gamma$ preferably falls within a range of $0.005 \leq \gamma \leq 0.06$.

When the MgO content represented by g is 0.001 as in the case of Sample No. 5, insulation resistance is low, and temperature-dependent characteristics fail to satisfy B and X7R characteristics. When g is more than 0.12 as in the case of Sample No. 6, unfavorable results are obtained, such as high sintering temperature, dielectric loss of more than 2.0%, extreme increase in defective rate of capacitors in a humidity resistance test and short average life. Therefore, g preferably falls within a range of $0.001 < g \leq 0.12$.

When the MnO content represented by h is 0.001 as in the case of Sample No. 7, measurement is impossible because the capacitors exhibit a semi-conducting property. When h is in excess of 0.12 as in the case of Sample No. 8, temperature-dependent characteristics fail to satisfy the X7R characteristics, and insulation resistance is disadvantageously low and the average life is short. Therefore, h preferably falls within a range of $0.001 < h \leq 0.12$.

When the total amount of MgO and MnO represented by g+h is more than 0.13 as in the case of Sample No. 9, unfavorable results are obtained, such as high dielectric loss of 2.0% or more, short average life, and an increase in the defectives rate of capacitors in the humidity resistance test. Therefore, g+h is preferably 0.13 or less.

When the ratio of $BaO/TiO_2$ represented by m is less than 1.000 as in the case of Sample No. 10, measurement is impossible because the capacitors exhibit a semiconducting property. When m is 1.000 as in the case of Sample No. 11, unfavorable results are obtained, such as low insulation resistance, low insulation breakdown voltage under application of AC and DC voltage and short average life. When m is more than 1.035 as in the case of Sample No. 12, measurement is impossible because of poor sintering. Therefore, m preferably falls within a range of $1.000 < m \leq 1.035$.

When the $SiO_2$ content is zero as in the case of Sample No. 13, sintering is poor. When the $SiO_2$ content is less than 0.2 mol as in the case of Sample No. 14, insulation resistance decreases with increase of sintering temperature and the defectives rate of capacitors becomes considerably high in the humidity resistance test. When the $SiO_2$ content is more than 5.0 mol, dielectric constant decreases, temperature-dependent characteristics fail to satisfy the X7R characteristics, and C×R fails to satisfy 5000 Ω·F or more at 25° C. and 200 Ω·F or more at 150° C. under a strong electric field of 10 kV/mm. Therefore, the silicon oxide content preferably falls within a range of 0.2 to 5.0 mol as $SiO_2$ with respect to 100 mol of the primary component.

Additionally, the amount of alkali metal oxide contained in barium titanate as an impurity is preferably 0.02 wt. % or less, since dielectric constant decreases when the alkali metal oxide content is more than 0.02 wt. %, as in the case of Sample No. 16.

Example 2

In a manner similar to that in Example 1, four species of barium titanate ($BaTiO_3$) shown in Table 1 and silicon oxide serving as an auxiliary component were prepared.

$BaCO_3$ and several oxides having purity of 99% or more were prepared. The oxides include $Sc_2O_3$, $Y_2O_3$, $BaZrO_3$, MgO and MnO. $BaCO_3$ was used for adjusting the mole ratio of Ba/Ti in barium titanate. These powder materials and the silicon oxide serving as an auxiliary component were weighed to prepare the compositions shown in Table 4. The amount of added silicon oxide is represented as an amount by mol with respect to 100 mol of the primary component, $[\{BaO\}_m TiO_2+\alpha M_2O_3+\gamma BaZrO_3+gMgO+hMnO]$. In a manner similar to that described in Example 1, laminated ceramic capacitors were prepared by use of the weighed mixtures. The outer size of each of the resultant laminated ceramic capacitors was the same as that in Example 1.

TABLE 4

| Sample No. | Type of BaTiO₃ | α Sc₂O₃ | Y₂O₃ | Total α | γ | g | h | g + h | m | SiO₂ (mol) |
|---|---|---|---|---|---|---|---|---|---|---|
| *101 | A | 0 | 0.0008 | 0.0008 | 0.03 | 0.11 | 0.005 | 0.115 | 1.005 | 4 |
| *102 | A | 0.02 | 0.05 | 0.07 | 0.03 | 0.06 | 0.06 | 0.12 | 1.005 | 3 |
| *103 | A | 0.02 | 0.01 | 0.03 | 0 | 0.02 | 0.03 | 0.05 | 1.01 | 1.5 |
| *104 | A | 0.02 | 0.01 | 0.03 | 0.08 | 0.02 | 0.04 | 0.06 | 1.01 | 1.5 |
| *105 | A | 0.005 | 0.015 | 0.02 | 0.02 | 0.001 | 0.034 | 0.035 | 1.01 | 1.5 |

TABLE 4-continued

| Sample No. | Type of BaTiO$_3$ | α Sc$_2$O$_3$ | Y$_2$O$_3$ | Total α | γ | g | h | g + h | m | SiO$_2$ (mol) |
|---|---|---|---|---|---|---|---|---|---|---|
| *106 | A | 0.01 | 0.02 | 0.03 | 0.03 | 0.125 | 0.005 | 0.13 | 1.01 | 4 |
| *107 | A | 0.01 | 0.03 | 0.04 | 0.02 | 0.079 | 0.001 | 0.08 | 1.01 | 3 |
| *108 | A | 0.01 | 0.02 | 0.03 | 0.02 | 0.005 | 0.125 | 0.13 | 1.01 | 2 |
| *109 | A | 0.02 | 0.01 | 0.03 | 0.02 | 0.06 | 0.08 | 0.14 | 1.01 | 3 |
| *110 | A | 0.01 | 0.02 | 0.03 | 0.03 | 0.03 | 0.02 | 0.05 | 0.99 | 1 |
| *111 | A | 0.01 | 0.01 | 0.02 | 0.03 | 0.03 | 0.02 | 0.05 | 1 | 1 |
| *112 | A | 0.01 | 0.01 | 0.02 | 0.02 | 0.01 | 0.03 | 0.04 | 1.04 | 4 |
| *113 | A | 0.01 | 0.01 | 0.02 | 0.03 | 0.01 | 0.02 | 0.03 | 1.01 | 0 |
| *114 | A | 0.02 | 0.01 | 0.03 | 0.02 | 0.005 | 0.045 | 0.05 | 1.01 | 0.1 |
| *115 | A | 0.01 | 0.02 | 0.03 | 0.03 | 0.11 | 0.01 | 0.12 | 1.01 | 8 |
| *116 | D | 0.02 | 0.01 | 0.03 | 0.03 | 0.03 | 0.03 | 0.06 | 1.01 | 2 |
| 117 | B | 0.01 | 0.01 | 0.02 | 0.03 | 0.01 | 0.02 | 0.03 | 1.005 | 1 |
| 118 | C | 0 | 0.02 | 0.02 | 0.02 | 0.02 | 0.015 | 0.035 | 1.01 | 1.5 |
| 119 | A | 0 | 0.001 | 0.001 | 0.02 | 0.12 | 0.002 | 0.122 | 1.015 | 4 |
| 120 | A | 0.01 | 0.04 | 0.05 | 0.03 | 0.01 | 0.12 | 0.13 | 1.01 | 3 |
| 121 | A | 0 | 0.01 | 0.01 | 0.005 | 0.02 | 0.01 | 0.03 | 1.01 | 1.5 |
| 122 | A | 0.02 | 0 | 0.02 | 0.04 | 0.02 | 0.02 | 0.04 | 1.01 | 1.5 |
| 123 | A | 0.01 | 0.02 | 0.03 | 0.06 | 0.02 | 0.03 | 0.05 | 1.005 | 1.5 |
| 124 | A | 0.01 | 0.01 | 0.02 | 0.02 | 0.03 | 0.02 | 0.05 | 1.035 | 5 |
| 125 | A | 0 | 0.02 | 0.02 | 0.03 | 0.005 | 0.025 | 0.03 | 1.015 | 0.2 |
| 126 | A | 0.01 | 0.05 | 0.06 | 0.03 | 0.01 | 0.1 | 0.11 | 1.01 | 2.5 |
| 127 | A | 0.02 | 0.02 | 0.04 | 0.03 | 0.01 | 0.04 | 0.05 | 1.01 | 1 |
| 128 | A | 0.01 | 0.02 | 0.02 | 0.02 | 0.02 | 0.05 | 0.07 | 1.01 | 2 |

Samples marked with * are beyond the scope of the present invention.

In a manner similar to that described in Example 1, the electric properties of the capacitors were measured. The results are shown in Table 5.

TABLE 5

| Sample No. | Firing temperature (° C.) | Dielectric constant | Dielectric loss: tan δ (%) | Rate of change in capacitance with temperature (%) | | | | Maximum value | DC bias characteristic (%) ΔC/C$_{25}$ 5 kV/mm |
|---|---|---|---|---|---|---|---|---|---|
| | | | | ΔC/C$_{20}$ | | ΔC/C$_{25}$ | | | |
| | | | | −25° C. | 85° C. | −55° C. | 125° C. | | |
| *101 | 1300 | 1720 | 0.8 | 5.6 | −12.4 | 4.7 | −17.1 | 19.9 | −51 |
| *102 | 1280 | 860 | 0.6 | 2 | −7.3 | 4.3 | −6.6 | 8.1 | −13 |
| *103 | 1280 | 1430 | 0.8 | 2.1 | −7.9 | 4.3 | −8.1 | 9 | −36 |
| *104 | 1300 | 1370 | 0.6 | 2.3 | −14.8 | 5 | −29.6 | 35.5 | −26 |
| *105 | 1280 | 1530 | 0.7 | 3.3 | −14.1 | 4.2 | −17.8 | 22.9 | −42 |
| *106 | 1360 | 1310 | 2.7 | 2.4 | −8.4 | 4.2 | −8.7 | 9.1 | −27 |
| *107 | Not measurable because of semiconductivity | | | | | | | | |
| *108 | 1280 | 1250 | 0.8 | 3.4 | −9 | 4.7 | −18.7 | 25.2 | −20 |
| *109 | 1280 | 1360 | 2.6 | 3.6 | −9.1 | 3.9 | −9 | 9.8 | −33 |
| *110 | Not measurable because of semiconductivity | | | | | | | | |
| *111 | 1300 | 1490 | 0.7 | 4 | −8.9 | 4.8 | −9.2 | 10.1 | −40 |
| *112 | Not measurable because of poor sintering | | | | | | | | |
| *113 | Not measurable because of poor sintering | | | | | | | | |
| *114 | 1360 | 1370 | 2.5 | 2.7 | −8.5 | 3 | −7.7 | 8.5 | −29 |
| *115 | 1300 | 1000 | 0.6 | 4.1 | −14.4 | 4.3 | −19 | 20.8 | −15 |
| *116 | 1300 | 1030 | 0.7 | 3.9 | −9 | 4.1 | −9.5 | 11 | −13 |
| 117 | 1280 | 1530 | 0.6 | 2.6 | −7.3 | 4.2 | −8.3 | 8.7 | −45 |
| 118 | 1300 | 1550 | 0.7 | 2.5 | −7.7 | 4 | −8.4 | 9 | −42 |
| 119 | 1280 | 1600 | 0.6 | 2.4 | −7.3 | 3.7 | −8.6 | 8.9 | −44 |
| 120 | 1280 | 1060 | 0.7 | 2.5 | −8 | 4.3 | −8.3 | 8.8 | −16 |
| 121 | 1300 | 1580 | 0.7 | 2.8 | −8 | 4 | −8.3 | 8.9 | −44 |
| 122 | 1300 | 1490 | 0.7 | 3.2 | −7 | 4.4 | −7.8 | 8.4 | −40 |
| 123 | 1280 | 1430 | 0.6 | 3.1 | −8.2 | 3.7 | −8.4 | 9.1 | −36 |
| 124 | 1300 | 1550 | 0.6 | 2.7 | −7.8 | 4.6 | −8 | 8.7 | −43 |
| 125 | 1280 | 1570 | 0.7 | 2.4 | −8.1 | 4 | −8.6 | 9 | −42 |
| 126 | 1300 | 1060 | 0.7 | 2.3 | −8.2 | 4.1 | −8.5 | 9 | −16 |
| 127 | 1300 | 1330 | 0.7 | 2.4 | −8.4 | 3.7 | −8.7 | 8.9 | −26 |
| 128 | 1300 | 1540 | 0.6 | 2.6 | −7.3 | 4.2 | −8.3 | 8.7 | −43 |

TABLE 5-continued

| Sample No. | C × R (Ω · F) | | | | Breakdown voltage (kV/mm) | | Number of defective capacitors in humidity resistance test | Average life (h) |
|---|---|---|---|---|---|---|---|---|
| | Application of 315 V | Application of 945 V | Application of 315 V | Application of 945 V | AC | DC | | |
| | 25° C. | | 150° C. | | | | | |
| *101 | 5140 | 4880 | 220 | 210 | 12 | 14 | 0/72 | 900 |
| *102 | 5040 | 4850 | 230 | 220 | 12 | 14 | 0/72 | 840 |
| *103 | 3150 | 2210 | 160 | 120 | 13 | 15 | 0/72 | 850 |
| *104 | 5180 | 4920 | 240 | 230 | 12 | 14 | 0/72 | 160 |
| *105 | 3060 | 2910 | 120 | 110 | 13 | 14 | 0/72 | 820 |
| *106 | 5150 | 4890 | 230 | 220 | 12 | 14 | 59/72 | 190 |
| *107 | Not measurable because of semiconductivity | | | | | | | |
| *108 | 3130 | 2970 | 130 | 120 | 12 | 14 | 0/72 | 180 |
| *109 | 5020 | 4770 | 250 | 240 | 12 | 14 | 16/72 | 140 |
| *110 | Not measurable because of semiconductivity | | | | | | | |
| *111 | 3290 | 3130 | 150 | 140 | 10 | 12 | 0/72 | 100 |
| *112 | Not measurable because of poor sintering | | | | | | | |
| *113 | Not measurable because of poor sintering | | | | | | | |
| *114 | 3140 | 2890 | 170 | 160 | 12 | 14 | 39/72 | 820 |
| *115 | 3320 | 3160 | 170 | 160 | 12 | 14 | 0/72 | 830 |
| *116 | 5110 | 3160 | 230 | 160 | 12 | 14 | 0/72 | 810 |
| 117 | 5060 | 4810 | 250 | 240 | 12 | 14 | 0/72 | 970 |
| 118 | 5150 | 4890 | 220 | 210 | 13 | 15 | 0/72 | 870 |
| 119 | 5060 | 4810 | 250 | 240 | 12 | 14 | 0/72 | 940 |
| 120 | 5220 | 4960 | 210 | 200 | 13 | 15 | 0/72 | 830 |
| 121 | 5190 | 4930 | 240 | 230 | 12 | 14 | 0/72 | 900 |
| 122 | 5310 | 5050 | 280 | 270 | 12 | 15 | 0/72 | 910 |
| 123 | 5230 | 4970 | 270 | 260 | 13 | 14 | 0/72 | 820 |
| 124 | 5240 | 4980 | 250 | 240 | 13 | 14 | 0/72 | 910 |
| 125 | 5090 | 4840 | 280 | 270 | 12 | 15 | 0/72 | 880 |
| 126 | 5240 | 4980 | 230 | 220 | 13 | 15 | 0/72 | 850 |
| 127 | 5170 | 4910 | 260 | 250 | 12 | 14 | 0/72 | 840 |
| 128 | 5050 | 4800 | 220 | 210 | 12 | 14 | 0/72 | 960 |

Samples marked with * are beyond the scope of the present invention.

As is clearly shown in Tables 4 and 5, the laminated ceramic capacitors of the present invention provide the following results: the rate of reduction in capacitance was −45% or less under application of a DC voltage of 5 kV/mm, dielectric loss was 1.0% or less and the rate of change in electrostatic capacity with temperature satisfied the B characteristics specified by JIS specifications within a range of −25° C. to +85° C., and satisfied the X7R characteristics specified by EIA specifications within a range of −55° C. to +125° C.

When the ceramic capacitor was used under a strong electric field of 10 kV/mm, insulation resistance represented by C×R product was as high as 5000 Ω·F or more at 25° C., and 200 Ω·F or more at 150° C. Breakdown voltage was as high as 12 kV/mm or more under application of AC voltage, and 14 kV/mm or more under application of DC voltage. In an accelerated test under application of 25 kV/mm at 150° C., the capacitor had a long life of 800 hours or longer, and could be fired at a relatively low temperature of 1300° C. or lower. There was little difference in electric properties between lots of capacitors, which are not shown in any tables.

Next will be described the reasons why the composition of the present invention is limited as described.

The primary component of the composition of the present invention is represented by $\{BaO\}_m TiO_2 + \alpha M_2O_3 + \gamma BaZrO_3 + gMgO + hMnO$ wherein $M_2O_3$ is $Sc_2O_3$ or $Y_2O_3$, and $\alpha$, $\gamma$, $g$ and $h$ each represent a mole ratio. When the amount of $M_2O_3$ represented by $\alpha$ is less than 0.001 as in the case of Sample No. 101, the temperature-dependent characteristics fail to satisfy the B and X7R characteristics. When $\alpha$ is more than 0.06 as in the case of Sample No. 102, the dielectric constant disadvantageously decreases to lower than 1000. Therefore, $\alpha$ preferably falls within a range of $0.001 \leq \alpha \leq 0.06$.

When the amount of $BaZrO_3$ represented by $\gamma$ is zero as in the case of Sample No. 103, insulation resistance is low and voltage dependence of insulation resistance is disadvantageously high, as compared with samples including $BaZrO_3$. When $\gamma$ is more than 0.06 as in the case of Sample No. 104, the temperature-dependent characteristics fail to satisfy the B and X7R characteristics and the average life is disadvantageously short. Therefore, $\gamma$ preferably falls within a range of $0.005 \leq \gamma \leq 0.06$.

When the amount of MgO represented by $g$ is 0.001 as in the case of Sample No. 105, insulation resistance is low, and temperature-dependent characteristics fail to satisfy B and X7R characteristics. When g is more than 0.12 as in the case of Sample No. 106, unfavorable results are obtained, such as high sintering temperature, dielectric loss of more than 2.0%, drastic increase in defective rate of capacitors in a humidity resistance test and short average life. Therefore, g preferably falls within a range of $0.001 < g \leq 0.12$.

When the MnO content represented by h is 0.001 as in the case of Sample No. 107, measurement is impossible because the capacitors for this sample No. exhibit a semi-conducting property. When h is more than 0.12 as in the case of Sample No. 108, temperature-dependent characteristics fail to satisfy the X7R characteristics, and insulation resistance is disadvantageously low and the average life is disadvantageously short. Therefore, h preferably falls within a range of $0.001 < h \leq 0.12$.

When the total amount of MgO and MnO represented by g+h is more than 0.13 as in the case of Sample No. 109, unfavorable results are obtained, such as high dielectric loss of 2.0% or more, short average life and increase in the defectives rate of capacitors in a humidity resistance test. Therefore, g+h is preferably 0.13 or less.

When the ratio of $BaO/TiO_2$ represented by m is less than 1.000 as in the case of Sample No. 110, measurement is impossible because the capacitors for this sample No. exhibit a semi-conducting property. When m is 1.000 as in the case of Sample No. 111, unfavorable results are obtained, such as low insulation resistance, low insulation breakdown under application of AC or DC voltage and short average life. When m is more than 1.035 as in the case of Sample No. 112, measurement is impossible because of poor sintering. Therefore, m preferably falls within a range of $1.000 < m \leq 1.035$.

When the $SiO_2$ content is zero as in the case of Sample No. 113, sintering is poor. When the $SiO_2$ content is less than 0.2 mol as in the case of Sample No. 114, insulation resistance decreases with increase in sintering temperature and the humidity resistance test produces a very high defectives rate of capacitors. When the $SiO_2$ content is more than 5.0 mol as in the case of Sample No. 115, dielectric constant decreases, the temperature-dependent characteristics fail to satisfy the X7R characteristics, and C×R fails to satisfy 5000 Ω·F or more at 25° C. and 200 Ω·F or more at 150° C. under a strong electric field of 10 kV/mm. Therefore, the amount of silicon oxide preferably falls within a range between 0.2 and 5.0 mol as $SiO_2$ with respect to 100 mol of the primary component.

Additionally, the amount of alkali metal oxide included in barium titanate as an impurity is preferably 0.02 wt. % or less, since dielectric constant decreases when the amount of alkali metal oxide is more than 0.02 wt. %, as in the case of Sample No. 116.

Example 3

In a manner similar to that described in Example 1, four species of barium titanate ($BaTiO_3$) shown in Table 1 and silicon oxide serving as an auxiliary component were prepared.

$BaCO_3$ and several oxides having purity of 99% or more were prepared. The oxides include $Sc_2O_3$, $Y_2O_3$, $Eu_2O_3$, $Gd_2O_3$, $Tb_2O_3$, $Dy_2O_3$, $BaZrO_3$, MgO and MnO. $BaCO_3$ was used for adjusting the mole ratio of Ba/Ti in barium titanate. These powder materials and the silicon oxide serving as an auxiliary component were weighed to prepare the compositions shown in Tables 6 and 7. The amount of added silicon oxide is represented as an amount by mol with respect to 100 mol of the primary component, $[\{BaO\}_m TiO_2 + \alpha M_2O_3 + \beta R_2O_3 + \gamma BazrO_3 + gMgO + hMnO]$. In a manner similar to that described in Example 1, laminated ceramic capacitors were prepared by use of the weighed mixtures. The outer size of each of the resultant laminated ceramic capacitors was the same as that in Example 1.

TABLE 6

$\{BaO\}_m \cdot TiO_2 + \alpha M_2O_3 + \beta R_2O_3 + \gamma BaZrO_3 + gMgO + hMnO$

| Sample No. | Type of $BaTiO_3$ | $\alpha$ $Sc_2O_3$ | $Y_sO_3$ | Total $\alpha$ | $\beta$ $Eu_2O_3$ | $Gd_2O_3$ | $Tb_2O_3$ | $Dy_2O_3$ | Total $\beta$ | $\alpha + \beta$ | $\gamma$ | g | h | g+h | m | $SiO_2$ (mol) |
|---|---|---|---|---|---|---|---|---|---|---|---|---|---|---|---|---|
| *201 | A | 0 | 0.0008 | 0.0008 | 0 | 0.05 | 0 | 0 | 0.05 | 0.0508 | 0.02 | 0.05 | 0.07 | 0.12 | 1.005 | 2 |
| *202 | A | 0.2 | 0.04 | 0.06 | 0 | 0 | 0.001 | 0 | 0.001 | 0.061 | 0.03 | 0.02 | 0.1 | 0.12 | 1.005 | 1 |
| *203 | A | 0.005 | 0.015 | 0.02 | 0 | 0 | 0.0008 | 0 | 0.0008 | 0.0208 | 0.03 | 0.02 | 0.03 | 0.05 | 1.005 | 2 |
| *204 | A | 0 | 0.001 | 0.001 | 0 | 0.03 | 0 | 0.025 | 0.055 | 0.056 | 0.03 | 0.03 | 0.09 | 0.12 | 1.01 | 2 |
| *205 | A | 0.01 | 0.02 | 0.03 | 0.02 | 0 | 0 | 0.02 | 0.04 | 0.07 | 0.03 | 0.11 | 0.01 | 0.12 | 1.01 | 4 |
| *206 | A | 0.01 | 0.01 | 0.02 | 0 | 0.02 | 0.02 | 0 | 0.04 | 0.06 | 0 | 0.07 | 0.05 | 0.12 | 1.01 | 1.5 |
| *207 | A | 0 | 0.01 | 0.01 | 0 | 0 | 0 | 0.02 | 0.02 | 0.03 | 0.08 | 0.03 | 0.04 | 0.07 | 1.01 | 3 |
| *208 | A | 0.02 | 0.01 | 0.03 | 0 | 0 | 0.01 | 0.01 | 0.02 | 0.05 | 0.02 | 0.001 | 0.069 | 0.07 | 1.01 | 1.5 |
| *209 | A | 0.01 | 0 | 0.01 | 0.01 | 0 | 0 | 0 | 0.01 | 0.02 | 0.02 | 0.125 | 0.002 | 0.127 | 1.01 | 4 |
| *210 | A | 0.01 | 0.01 | 0.02 | 0.01 | 0.01 | 0 | 0 | 0.02 | 0.04 | 0.02 | 0.079 | 0.001 | 0.08 | 1.01 | 1.5 |
| *211 | A | 0.01 | 0 | 0.01 | 0 | 0.01 | 0 | 0.01 | 0.02 | 0.03 | 0.02 | 0.002 | 0.125 | 0.127 | 1.01 | 2 |
| *212 | A | 0.02 | 0.01 | 0.03 | 0.02 | 0 | 0 | 0.01 | 0.03 | 0.06 | 0.03 | 0.06 | 0.08 | 0.14 | 1.01 | 3 |
| *213 | A | 0.005 | 0.005 | 0.01 | 0 | 0.01 | 0.01 | 0 | 0.02 | 0.03 | 0.03 | 0.03 | 0.025 | 0.055 | 0.99 | 1 |
| *214 | A | 0.01 | 0 | 0.01 | 0.01 | 0.005 | 0.005 | 0.01 | 0.03 | 0.04 | 0.04 | 0.04 | 0.03 | 0.07 | 1 | 1 |
| *215 | A | 0.005 | 0.005 | 0.01 | 0 | 0 | 0.01 | 0 | 0.01 | 0.02 | 0.04 | 0.02 | 0.03 | 0.05 | 1.04 | 4 |
| *216 | A | 0 | 0.01 | 0.01 | 0 | 0 | 0.01 | 0.01 | 0.02 | 0.03 | 0.01 | 0.01 | 0.01 | 0.02 | 1.01 | 0 |
| *217 | A | 0.01 | 0 | 0.01 | 0 | 0.01 | 0.01 | 0.01 | 0.03 | 0.04 | 0.04 | 0.01 | 0.05 | 0.06 | 1.01 | 0.1 |
| *218 | A | 0.03 | 0 | 0.03 | 0.01 | 0.02 | 0 | 0 | 0.03 | 0.06 | 0.03 | 0.11 | 0.01 | 0.12 | 1.005 | 8 |
| *219 | D | 0 | 0.01 | 0.01 | 0 | 0.01 | 0.02 | 0 | 0.03 | 0.04 | 0.03 | 0.04 | 0.05 | 0.09 | 1.01 | 2 |
| 220 | B | 0.01 | 0.01 | 0.02 | 0 | 0 | 0.01 | 0 | 0.01 | 0.03 | 0.02 | 0.03 | 0.02 | 0.05 | 1.01 | 1.5 |

Samples marked with * are beyond the scope of the present invention.

TABLE 7

$\{BaO\}_m \cdot TiO_2 + \alpha M_2O_3 + \beta R_2O_3 + \gamma BaZrO_3 + gMgO + hMnO$

| Sample No. | Type of $BaTiO_3$ | $\alpha$ $Sc_2O_3$ | $Y_sO_3$ | Total $\alpha$ | $\beta$ $Eu_2O_3$ | $Gd_2O_3$ | $Tb_2O_3$ | $Dy_2O_3$ | Total $\beta$ | $\alpha + \beta$ | $\gamma$ | g | h | g+h | m | $SiO_2$ (mol) |
|---|---|---|---|---|---|---|---|---|---|---|---|---|---|---|---|---|
| 221 | C | 0 | 0.02 | 0.02 | 0 | 0 | 0 | 0.01 | 0.01 | 0.03 | 0.02 | 0.03 | 0.03 | 0.06 | 1.005 | 1.5 |
| 222 | A | 0 | 0.001 | 0.001 | 0.02 | 0 | 0.009 | 0 | 0.029 | 0.03 | 0.02 | 0.04 | 0.01 | 0.05 | 1.015 | 2 |
| 223 | A | 0.01 | 0.04 | 0.05 | 0 | 0.005 | 0 | 0 | 0.005 | 0.055 | 0.03 | 0.002 | 0.11 | 0.112 | 1.01 | 1.5 |

TABLE 7-continued

| | | {BaO}$_m$·TiO$_2$ + αM$_2$O$_3$ + βR$_2$O$_3$ + γBaZrO$_3$ + gMgO + hMnO | | | | | | | | | | | | | |
|---|---|---|---|---|---|---|---|---|---|---|---|---|---|---|---|
| Sample | Type of | α | | | β | | | | | | | | | | SiO$_2$ |
| No. | BaTiO$_3$ | Sc$_2$O$_3$ | Y$_s$O$_3$ | Total α | Eu$_2$O$_3$ | Gd$_2$O$_3$ | Tb$_2$O$_3$ | Dy$_2$O$_3$ | Total β | α + β | γ | g | h | g + h | m | (mol) |
| 224 | A | 0.02 | 0.01 | 0.03 | 0 | 0 | 0 | 0.01 | 0.01 | 0.04 | 0.03 | 0.12 | 0.002 | 0.122 | 1.03 | 5 |
| 225 | A | 0 | 0.01 | 0.01 | 0 | 0.02 | 0.03 | 0 | 0.05 | 0.06 | 0.03 | 0.002 | 0.11 | 0.112 | 1.01 | 2 |
| 226 | A | 0.005 | 0.005 | 0.01 | 0 | 0 | 0 | 0.001 | 0.001 | 0.011 | 0.02 | 0.01 | 0.02 | 0.03 | 1.005 | 1 |
| 227 | A | 0.02 | 0.01 | 0.03 | 0 | 0.01 | 0.01 | 0 | 0.02 | 0.05 | 0.03 | 0.01 | 0.12 | 0.13 | 1.01 | 1.5 |
| 228 | A | 0 | 0.01 | 0.01 | 0 | 0.02 | 0 | 0 | 0.02 | 0.03 | 0.005 | 0.03 | 0.02 | 0.05 | 1.01 | 2 |
| 229 | A | 0.01 | 0.01 | 0.02 | 0 | 0.01 | 0.01 | 0 | 0.02 | 0.04 | 0.06 | 0.02 | 0.05 | 0.07 | 1.01 | 2 |
| 230 | A | 0.01 | 0.01 | 0.02 | 0 | 0 | 0.01 | 0.01 | 0.02 | 0.04 | 0.03 | 0.03 | 0.05 | 0.08 | 1.035 | 4 |
| 231 | A | 0.01 | 0.01 | 0.02 | 0 | 0 | 00.01 | 0.01 | 0.02 | 0.04 | 0.03 | 0.01 | 0.06 | 0.07 | 1.01 | 0.2 |
| 232 | A | 0 | 0.02 | 0.02 | 0 | 0 | 0 | 0.01 | 0.01 | 0.03 | 0.03 | 0.02 | 0.04 | 0.06 | 1.01 | 1.5 |
| 233 | A | 0.01 | 0.01 | 0.02 | 0.01 | 0 | 0.01 | 0 | 0.02 | 0.04 | 0.03 | 0.01 | 0.06 | 0.07 | 1.01 | 1.5 |
| 234 | A | 0 | 0.01 | 0.01 | 0.01 | 0.01 | 0 | 0 | 0.02 | 0.03 | 0.02 | 0.03 | 0.02 | 0.05 | 1.01 | 1.5 |

In a manner similar to that described in Example 1, the electric properties of the capacitors were measured. The results are shown in Tables 8 and 9.

TABLE 8

| Sample No. | Firing temperature (° C.) | Dielectric constant | Dielectric loss: tan δ (%) | Rate of change in capacitance with temperature (%) | | | | | DC bias characteristic (%) |
|---|---|---|---|---|---|---|---|---|---|
| | | | | ΔC/C$_{20}$ | | ΔC/C$_{25}$ | | Maximum value | ΔC/C$_{25}$ 5 kV/mm |
| | | | | -25° C. | 85° C. | -55° C. | 125° C. | | |
| *201 | 1300 | 1220 | 0.7 | 5.7 | -11.9 | 6.5 | -17.4 | 20.9 | -20 |
| *202 | 1300 | 950 | 0.6 | 2.2 | -7.9 | 4.6 | -7 | 8.8 | -17 |
| *203 | 1300 | 1560 | 0.6 | 3.1 | -7.8 | 5.1 | -6.7 | 8.4 | -43 |
| *204 | 1300 | 910 | 0.7 | 5.9 | -13 | 7.4 | -19.1 | 25.4 | -13 |
| *205 | 1280 | 970 | 2 | 2.2 | -7.9 | 4.3 | -7 | 8.4 | -15 |
| *206 | 1280 | 1060 | 0.7 | 1.8 | -8.3 | 2.9 | -7.6 | 9 | -17 |
| *207 | 1300 | 1450 | 0.8 | 2.3 | -14.2 | 4.6 | -31.4 | 36.1 | -35 |
| *208 | 1280 | 1270 | 0.8 | 2.1 | -12.6 | 4.5 | -16.4 | 21.4 | -27 |
| *209 | 1360 | 1540 | 2.6 | 2.4 | -7.6 | 5.1 | -7.4 | 8.4 | -44 |
| *210 | Not measurable because of semiconductivity | | | | | | | | |
| *211 | 1280 | 1470 | 0.7 | 3.1 | -8.4 | 5.2 | -17.8 | 23.5 | -39 |
| *212 | 1280 | 930 | 2.1 | 2.2 | -8.3 | 4.4 | -8.6 | 8.8 | -15 |
| *213 | Not measurable because of semiconductivity | | | | | | | | |
| *214 | 1300 | 1350 | 0.7 | 3.3 | -8.5 | 5.2 | -8.1 | 9.4 | -31 |
| *215 | Not measurable because of poor sintering | | | | | | | | |
| *216 | Not measurable because of poor sintering | | | | | | | | |
| *217 | 1360 | 1330 | 0.8 | 3.5 | -9.3 | 4 | -12.9 | 12.9 | -26 |
| *218 | 1300 | 950 | 0.8 | 3.2 | -13.2 | 3.8 | -28.5 | 28.5 | -13 |
| *219 | 1300 | 1150 | 0.7 | 2.3 | -8.8 | 7.1 | -8.2 | 9.4 | -25 |
| 220 | 1280 | 1490 | 0.7 | 2.6 | -8.4 | 6.1 | -8.1 | 9.1 | -41 |

| Sample No. | C × R (Ω · F) | | | | Breakdown voltage (kV/mm) | | Number of defective capacitors in humidity resistance test | Average life (h) |
|---|---|---|---|---|---|---|---|---|
| | Application of 315 V | Application of 945 V | Application of 315 V | Application of 945 V | AC | DC | | |
| | 25° C. | | 150° C. | | | | | |
| *201 | 5120 | 4870 | 230 | 220 | 12 | 14 | 0/72 | 880 |
| *202 | 8510 | 8080 | 190 | 180 | 12 | 14 | 0/72 | 850 |
| *203 | 3030 | 2880 | 130 | 120 | 13 | 14 | 0/72 | 890 |
| *204 | 5070 | 4820 | 260 | 250 | 12 | 14 | 0/72 | 130 |
| *205 | 5060 | 4810 | 250 | 240 | 13 | 14 | 39/72 | 170 |
| *206 | 3130 | 2190 | 150 | 110 | 13 | 14 | 0/72 | 860 |
| *207 | 5170 | 4910 | 250 | 240 | 12 | 14 | 0/72 | 170 |
| *208 | 3080 | 2930 | 120 | 110 | 13 | 14 | 0/72 | 820 |
| *209 | 5120 | 4870 | 240 | 230 | 12 | 14 | 43/72 | 110 |
| *210 | Not measurable because of semiconductivity | | | | | | | |
| *211 | 3140 | 2980 | 140 | 130 | 12 | 14 | 0/72 | 140 |
| *212 | 5070 | 4810 | 250 | 240 | 12 | 14 | 20/72 | 110 |
| *213 | Not measurable because of semiconductivity | | | | | | | |
| *214 | 3190 | 3030 | 150 | 140 | 10 | 11 | 0/72 | 120 |
| *215 | Not measurable because of poor sintering | | | | | | | |
| *216 | Not measurable because of poor sintering | | | | | | | |
| *217 | 3130 | 2970 | 180 | 170 | 12 | 14 | 38/72 | 800 |

TABLE 8-continued

|      |      |      |     |     |    |    |      |     |
|------|------|------|-----|-----|----|----|------|-----|
| *218 | 3280 | 3120 | 160 | 150 | 12 | 14 | 0/72 | 820 |
| *219 | 5190 | 4930 | 290 | 280 | 12 | 14 | 0/72 | 870 |
| 220  | 5220 | 4960 | 220 | 210 | 12 | 14 | 0/72 | 900 |

TABLE 9

| Sample No. | Firing temperature (° C.) | Dielectric constant | Dielectric loss: tan δ (%) | Rate of change in capacitance with temperature (%) | | | | Maximum value | DC bias characteristic (%) ΔC/C$_{25}$ 5 kV/mm |
|---|---|---|---|---|---|---|---|---|---|
| | | | | ΔC/C$_{20}$ | | ΔC/C$_{25}$ | | | |
| | | | | −25° C. | 85° C. | −55° C. | 125° C. | | |
| 221 | 1280 | 1450 | 0.6 | 1.9 | −7.9 | 6.6 | −8.1 | 8.7 | −39 |
| 222 | 1280 | 1490 | 0.6 | 5.3 | −7.1 | 6.6 | −6.9 | 8.6 | −40 |
| 223 | 1300 | 1070 | 0.6 | 2 | −8.9 | 5.4 | −8.4 | 9.3 | −18 |
| 224 | 1280 | 1360 | 0.6 | 1.8 | −8.4 | 5.7 | −7.7 | 8.8 | −30 |
| 225 | 1300 | 1090 | 0.7 | 2.2 | −8.7 | 5.6 | −8.2 | 9.1 | −18 |
| 226 | 1300 | 1640 | 0.7 | 2 | −7.6 | 6 | −7.6 | 8.8 | −45 |
| 227 | 1300 | 1070 | 0.7 | 2 | −8.9 | 5.4 | −8.4 | 9.3 | −18 |
| 228 | 1280 | 1430 | 0.6 | 2.1 | −8.1 | 5.4 | −7.8 | 8.8 | −35 |
| 229 | 1300 | 1360 | 0.6 | 2.4 | −8 | 5.9 | −7.7 | 8.1 | −33 |
| 230 | 1300 | 1360 | 0.7 | 2.1 | −8 | 5.9 | −7.9 | 8.4 | −31 |
| 231 | 1300 | 1340 | 0.6 | 1.9 | −8.1 | 6 | −7.8 | 8.6 | −31 |
| 232 | 1280 | 1440 | 0.6 | 2.4 | −7.9 | 6.9 | −7.8 | 8.7 | −39 |
| 233 | 1300 | 1430 | 0.6 | 2.1 | −8 | 6.4 | −7.6 | 9.1 | −37 |
| 234 | 1300 | 1420 | 0.7 | 3.1 | −7.8 | 6.8 | −7.2 | 8.7 | −37 |

| Sample No. | C × R (Ω · F) | | | | Breakdown voltage (kV/mm) | | Number of defective capacitors in humidity resistance test | Average life (h) |
|---|---|---|---|---|---|---|---|---|
| | Application of 315 V | Application of 945 V | Application of 315 V | Application of 945 V | | | | |
| | 25° C. | | 150° C. | | AC | DC | | |
| 221 | 5230 | 4970 | 270 | 260 | 12 | 14 | 0/72 | 900 |
| 222 | 5080 | 4830 | 260 | 250 | 12 | 15 | 0/72 | 910 |
| 223 | 5210 | 4950 | 230 | 220 | 12 | 15 | 0/72 | 940 |
| 224 | 5290 | 5030 | 300 | 290 | 12 | 15 | 0/72 | 880 |
| 225 | 5210 | 4950 | 230 | 220 | 13 | 15 | 0/72 | 940 |
| 226 | 5220 | 4960 | 240 | 230 | 12 | 14 | 0/72 | 830 |
| 227 | 5210 | 4950 | 230 | 220 | 12 | 15 | 0/72 | 940 |
| 228 | 5070 | 4820 | 290 | 280 | 12 | 15 | 0/72 | 860 |
| 229 | 5090 | 4840 | 210 | 200 | 12 | 14 | 0/72 | 840 |
| 230 | 5370 | 5100 | 260 | 250 | 12 | 14 | 0/72 | 890 |
| 231 | 5080 | 4830 | 260 | 250 | 12 | 14 | 0/72 | 900 |
| 232 | 5240 | 4980 | 280 | 270 | 12 | 14 | 0/72 | 850 |
| 233 | 5270 | 5010 | 270 | 260 | 12 | 14 | 0/72 | 930 |
| 234 | 5280 | 5020 | 270 | 260 | 12 | 14 | 0/72 | 840 |

As is clearly shown in Tables 8 and 9, the laminated ceramic capacitors of the present invention provide the following results: the rate of reduction in capacitance is −45% or less under application of a DC voltage of 5 kV/mm, dielectric loss is 1.0% or less, and the rate of change in electrostatic capacity with temperature satisfies the B characteristics specified by JIS specifications within a range of −25° C. to +85° C., and satisfies the X7R characteristics specified by EIA specifications within a range of −55° C. to +125° C.

When the ceramic capacitor was used under a strong electric field of 10 kV/mm, insulation resistance represented by C×R was as high as 5000 Ω·F or more at 25° C., and 200 Ω·F or more at 150° C. Breakdown voltage was as high as 12 kV/mm or more under application of AC voltage, and 14 kV/mm or more under application of DC voltage. In an accelerated test under application of 25 kV/mm at 150° C., the capacitor had a long life of 800 hours or longer and could be fired at a relatively low temperature of 1300° C. or lower. There was little difference in electric properties between lots of capacitors, which are not shown in any tables.

Next will be described the reasons why the composition of the present invention is limited as described.

The primary component of the composition of the present invention is represented by $\{BaO\}_m TiO_2 + \alpha M_2O_3 + \beta R_2O_3 + \gamma BaZrO_3 + gMgO + hMnO$ wherein $M_2O_3$ is $Sc_2O_3$ or $Y_2O_3$, $R_2O_3$ is selected from the group consisting of $Eu_2O_3$, $Gd_2O_3$, $Tb_2O_3$, and $Dy_2O_3$, and α, β, γ, g, and h each represent a mole ratio.

When the amount of $M_2O_3$ represented by α is less than 0.001 as in the case of Sample No. 201, the temperature dependent characteristics fail to satisfy the B and X7R characteristics, whereas when α is more than 0.05 as in the case of Sample No. 202, the dielectric constant disadvantageously decreases to lower than 1000. Therefore, α preferably falls within a range of $0.001 \leq \alpha \leq 0.05$.

When the amount of $R_2O_3$ represented by β is less than 0.001 as in the case of Sample No. 203, insulation resistance is low and C×R (Ω·F) disadvantageously decreases. When β is more than 0.05 as in the case of Sample No. 204, the temperature-dependent characteristics fail to satisfy the B and X7R characteristics. Therefore, β preferably falls within a range of $0.001 \leq \beta \leq 0.05$.

When the total amount of $M_2O_3$ and $R_2O_3$ represented by α+β is more than 0.06 as in the case of Sample No. 205, unfavorable results are obtained, such as high dielectric loss of 2.0% or more, short average life and an increase in defective of capacitors in the humidity resistance test. Therefore, α+β is preferably 0.06 or less.

When the $BaZrO_3$ content represented by γ is zero as in the case of Sample No. 206, insulation resistance is low and temperature dependence of insulation resistance is disadvantageously higher than that of a system having $BaZrO_3$. When γ is more than 0.06 as in the case of Sample No. 207, the temperature-dependent characteristics fail to satisfy the B and X7R characteristics and the average life is disadvantageously short. Therefore, γ is preferably within a range of $0.005 \leq \gamma \leq 0.06$.

When the amount of MgO represented by g is 0.001 as in the case of Sample No. 208, insulation resistance is low, and the temperature-dependent characteristics disadvantageously fail to satisfy both B and X7R. When g is more than 0.12 as in the case of Sample No. 209, unfavorable results are obtained, such as high sintering temperature, high dielectric loss of more than 2.0%, drastic increase in defective capacitors in the humidity resistance test and short average life. Therefore, g preferably falls within a range of $0.001 < \gamma \leq 0.12$.

When the amount of MnO represented by h is 0.001 as in the case of Sample No. 210, measurement is impossible because the capacitors for this sample No. exhibit a semi-conducting property. When h is more than 0.12 as in the case of Sample No. 211, the temperature-dependent characteristics disadvantageously fail to satisfy the X7R characteristics, insulation resistance is low and the average life is short. Therefore, h preferably falls within a range of $0.001 < h \leq 0.12$.

When the total amount of MgO and MnO represented by g+h is more than 0.13 as in the case of Sample No. 212, unfavorable results are obtained, such as high dielectric loss of 2.0% or more, short average life, and increase in defective capacitors in the humidity resistance test. Therefore, g+h is preferably 0.13 or less.

When the ratio of $BaO/TiO_2$ represented by m is less than 1.000 as in the case of Sample No. 213, measurement is impossible because the capacitors for this sample exhibit a semi-conducting property. When m is 1.000 as in the case of Sample No. 214, unfavorable results are obtained, such as low insulation resistance, low insulation breakdown voltage under application of AC or DC voltage and short average life. When m is more than 1.035 as in the case of Sample No. 215, the measurement is impossible because of poor sintering. Therefore, m preferably falls within a range of $1.000 < m \leq 1.035$.

When the $SiO_2$ content is zero as in the case of Sample No. 216, insufficient sintering results. When the $SiO_2$ content is less than 0.2 mol as in the case of Sample No. 217, insulation resistance decreases with the increase of sintering temperature, and the rate of defective capacitors is considerably high in the humidity resistance test. When the $SiO_2$ content is more than 5.0 mol as in the case of Sample No. 218, dielectric constant decreases, the temperature-dependent characteristic of capacitance fails to satisfy the XR7 characteristic, and C×R fails to satisfy 5000 Ω·F or more at 25° C. and 200 Ω·F or more at 150° C. under a strong electric field of 10 kV/mm. Therefore, the silicon oxide content is preferably in the range between 0.2 and 5.0 mol as $SiO_2$ with respect to 100 mol of the primary component.

The alkali metal oxide contained in barium titanate as an impurity is limited to 0.02 wt. % or less. This is because dielectric constant decreases when the alkali metal oxide content is in excess of 0.02 wt. % as in the case of Sample No. 219.

In the above-described Examples, a barium titanate powder produced through an oxalic acid method was used. However, barium titanate is not limited only to the above-produced barium titanate. Barium titanate powder produced by use of the alkoxide method or hydrothermal synthesis method may be used. Use of such barium titanate powders may produce laminated ceramic capacitors having properties which are superior to those of capacitors described in the above Examples.

Oxide powders such as $Sc_2O_3$, $Y_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, MgO, MnO and $BaZrO_3$ were used as starting materials; however, the present invention is not limited only to these materials. Solutions of alkoxides or organic metals may be used so as to produce capacitors of the same properties, so long as the dielectric ceramic layer within the scope of the present invention is produced.

In the present invention, although there are employed specific oxide powders such as $Sc_2O_3$, $Y_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, MgO, MnO and $BaZrO_3$, the present invention is not limited by these species. That is, so long as the dielectric ceramic layer which falls within the scope of the present invention is formed, use of a solution of an alkoxide or organometallics does not impede the characteristics of the capacitors of the present invention.

As described hereinabove, even when sintered in a reducing atmosphere, the dielectric ceramic composition according to the present invention is neither reduced nor transformed to have semiconductivity. Moreover, the composition can be sintered at a relatively low temperature of 1300° C. or less.

Therefore, use of the dielectric ceramic composition according to the present invention as a dielectric ceramic layer in the fabrication of laminated ceramic capacitors allows employment, as electrode material, of a base metal such as nickel or nickel alloy, leading to reduction in production cost of laminated ceramic capacitors.

In use, the laminated ceramic capacitor making use of the dielectric ceramic composition of the invention exhibits excellent characteristics, particularly when it is used in a strong electric field of 10 kV/mm, where conventional laminated ceramic capacitors, which includes nickel or nickel alloy as internal electrodes, cannot secure reliability due to low insulation resistance. That is, the mentioned excellent characteristics of the laminated ceramic capacitor of the present invention include the following: high insulation resistance at room temperature as expressed by C×R of (5000 Ω·F) and 150° C. (200 Ω·F); insulation resistance being less dependent on voltage; the absolute value of rate of reduction in capacitance being 45% or less under application of a DC voltage of 5 kV/mm; high dielectric strength; temperature-dependent characteristics of electrostatic capacity satisfy the B characteristic specified by JIS specifications and the X7R characteristic specified by EIA specifications; and weather resistance as proven in a high temperature test and high humidity test performed under DC 25 kV/mm at 150° C.

What is claimed is:

1. A dielectric ceramic composition which comprises a primary component and an auxiliary component;

the primary component comprising barium titanate having an alkali metal oxide content of 0.02 wt % or less, barium zirconate, magnesium oxide and manganese oxide, and is represented by the formula:

$$\{BaO\}_m TiO_2 + \alpha M_2O_3 + \beta R_2O_3 + \gamma BaZrO_3 + gMgO + hMnO$$

wherein $M_2O_3$ is at least one of $Sc_2O_3$ or $Y_2O_3$; $R_2O_3$ is at least one member selected from the group consisting of $Eu_2O_3$, $Gd_2O_3$, $Tb_2O_3$, $Dy_2O_3$, $Ho_2O_3$, $Er_2O_3$, $Tm_2O_3$ and $Yb_2O_3$, $\alpha$, $\beta$, $\gamma$, g or h each represent a mole ratio; and $\alpha$ is 0 or $0.001 \leq \alpha \leq 0.06$;
$\beta$ is 0 or $0.001 \leq \beta \leq 0.06$;
$0.001 \leq \gamma \leq 0.06$;
$0.001 < g \leq 0.12$;
$0.001 < h \leq 0.12$;
$\alpha + \beta \leq 0.06$
$g + h \leq 0.13$; and
$1.000 < m \leq 1.035$, provided that when $\alpha$ has a positive value, $R_2O_3$ is at least one member selected from the group consisting of $Eu_2O_3$, $Gd_2O_3$, $Tb_2O_3$ and $Dy_2O_3$ and when $\beta$ has a positive value, $0.005 \leq \gamma$; and the auxiliary component being silicon oxide in an amount of 0.2–5.0 mol calculated as $SiO_2$ with respect to 100 mols of the primary component.

2. A laminated ceramic capacitor comprising a plurality of dielectric ceramic layers, internal electrodes between the dielectric ceramic layers, and external electrodes electrically connected to the internal electrodes, wherein the dielectric ceramic layers comprise the dielectric ceramic composition of claim 1.

3. A laminated ceramic capacitor according to claim 2 wherein the internal electrodes are nickel or a nickel alloy.

4. A laminated ceramic capacitor according to claim 3, wherein the external electrodes comprise a sintered layer of conductive metal powder or of glass frit-containing conductive metal powder.

5. A laminated ceramic capacitor according to claim 4, wherein the external electrodes comprise a first sintered layer of conductive metal powder or glass frit-containing conductive metal powder; and a second layer which is a plating layer provided thereon.

6. A dielectric ceramic composition according to claim 1 wherein the primary component is represented by the formula:

$$\{BaO\}_m TiO_2 + \beta R_2O_3 + \gamma BaZrO_3 + gMgO + hMnO$$

wherein $R_2O_3$ is at least one member selected from the group consisting of $Eu_2O_3$, $Gd_2O_3$, $Tb_2O_3$, $Dy_2O_3$, $Ho_2O_3$, $Er_2O_3$, $Tm_2O_3$ and $Yb_2O_3$; $0.001 \leq \beta \leq 0.06$; and $0.005 \leq \gamma \leq 0.06$.

7. A laminated ceramic capacitor comprising a plurality of dielectric ceramic layers, internal electrodes between the dielectric ceramic layers, and external electrodes electrically connected to the internal electrodes, wherein the dielectric ceramic layers comprise the dielectric ceramic composition of claim 6.

8. A laminated ceramic capacitor according to claim 7 wherein the internal electrodes are nickel or a nickel alloy.

9. A laminated ceramic capacitor according to claim 8, wherein the external electrodes comprise a sintered layer of conductive metal powder or of glass frit-containing conductive metal powder.

10. A laminated ceramic capacitor according to claim 8, wherein the external electrodes comprise a first sintered layer of conductive metal powder or glass frit-containing conductive metal powder; and a second layer which is a plating layer provided thereon.

11. A dielectric ceramic composition according to claim 1 wherein the primary component is represented by the formula:

$$\{BaO\}_m TiO_2 + \alpha M_2O_3 + \gamma BaZrO_3 + gMgO + hMnO$$

wherein $0.001 \leq \alpha \leq 0.06$; and $0.001 \leq \gamma \leq 0.06$.

12. A laminated ceramic capacitor comprising a plurality of dielectric ceramic layers, internal electrodes between the dielectric ceramic layers, and external electrodes electrically connected to the internal electrodes, wherein the dielectric ceramic layers comprise the dielectric ceramic composition of claim 11.

13. A laminated ceramic capacitor according to claim 9, wherein the external electrodes comprise a first sintered layer of conductive metal powder or glass frit-containing conductive metal powder; and a second layer which is a plating layer provided thereon.

14. A laminated ceramic capacitor according to claim 12 wherein the internal electrodes are nickel or a nickel alloy.

15. A laminated ceramic capacitor according to claim 14, wherein the external electrodes comprise a sintered layer of conductive metal powder or of glass frit-containing conductive metal powder.

16. A dielectric ceramic composition according to claim 1 wherein the primary component is represented by the formula:

$$\{BaO\}_m TiO_2 + \alpha M_2O_3 + \beta R_2O_3 + \gamma BaZrO_3 + gMgO + hMnO$$

wherein $R_2O_3$ is at least one member selected from the group consisting of $Eu_2O_3$, $Gd_2O_3$, $Tb_2O_3$ and $Dy_2O_3$, $0.001 \leq \alpha \leq 0.05$; $0.001 \leq \beta \leq 0.05$; and $0.005 \leq \gamma \leq 0.06$.

17. A laminated ceramic capacitor comprising a plurality of dielectric ceramic layers, internal electrodes between the dielectric ceramic layers, and external electrodes electrically connected to the internal electrodes, wherein the dielectric ceramic layers comprise the dielectric ceramic composition of claim 16.

18. A laminated ceramic capacitor according to claim 17 wherein the internal electrodes are nickel or a nickel alloy.

19. A laminated ceramic capacitor according to claim 18, wherein the external electrodes comprise a sintered layer of conductive metal powder or of glass frit-containing conductive metal powder.

20. A laminated ceramic capacitor according to claim 18, wherein the external electrodes comprise a first sintered layer of conductive metal powder or glass frit-containing conductive metal powder; and a second layer which is a plating layer provided thereon.

* * * * *